United States Patent [19]

Ichiura et al.

[11] Patent Number: 5,734,780
[45] Date of Patent: Mar. 31, 1998

[54] RECORDING/REPRODUCING DEVICE WHICH RECEIVES AN FM MULTIPLEXED SIGNAL COMPRISING A SUBCARRIER OR A DARC SIGNAL AND OUTPUTS TRAFFIC INFORMATION AFTER DETECTING AN INTERMISSION

[75] Inventors: Shuichi Ichiura; Nobutoshi Oki, both of Gifu, Japan

[73] Assignee: Sanyo Electric Co., Ltd., Osaka, Japan

[21] Appl. No.: 432,587

[22] Filed: May 1, 1995

[30] Foreign Application Priority Data

May 11, 1994 [JP] Japan ................. 6-097563

[51] Int. Cl.⁶ ............. H04B 1/18; H04N 5/91; H04N 7/00; G08G 1/04
[52] U.S. Cl. .......... 386/46; 455/186.1; 386/125; 340/905
[58] Field of Search .............. 358/335, 310, 358/342, 341, 343; 360/33.1, 19.1, 61; 455/45, 42, 345, 186.1; 348/461, 462, 468, 471–487; 386/126, 46; 340/988, 996, 460, 474, 905; 381/86

[56] References Cited

U.S. PATENT DOCUMENTS

| 4,153,878 | 5/1979 | Osborn | 325/370 |
|---|---|---|---|
| 4,862,513 | 8/1989 | Bragas | 455/45 |
| 4,945,412 | 7/1990 | Kramer | 358/142 |
| 5,101,510 | 3/1992 | Duckeck | 455/186 |
| 5,189,691 | 2/1993 | Dunlap | 379/70 |
| 5,206,641 | 4/1993 | Grant et al. | 340/905 |
| 5,274,560 | 12/1993 | LaRue | 364/444 |
| 5,493,709 | 2/1996 | Duckeck et al. | 455/185.1 |

FOREIGN PATENT DOCUMENTS

450631A2  9/1991  European Pat. Off.
4-372229  12/1992  Japan.

OTHER PUBLICATIONS

Suka, Munehiro et al. Development of DARC decoding..., IEEE, pp. 570–579, Aug. 1994.
Hamamatsucho, MPT Receives Report on Technological Conditions..., Promt, Apr. 26, 1995.
Sanyo and NHK Develop Decoder LSIs for FM Datacasts, Audio Week, pp. 1–2, Mar. 21, 1994.
1994 Vehicle Navigation & Information Systems Conference Proceedings (pp. 111–116).

*Primary Examiner*—Tommy P. Chin
*Assistant Examiner*—David R. Vincent
*Attorney, Agent, or Firm*—Armstrong, Westerman, Hattori, McLeland & Naughton

[57] ABSTRACT

In a multiplexed information receiving device of the present invention, a specific information receiving circuit separates and demodulates a received FM multiplexed signal. A specific information reconstructing circuit reconstructs program information based on a demodulated signal. A specific information recording/reproducing device carries out writing/reading operation of the program information to/from a recording medium. When an update detecting circuit detects update of specific information, and an intermission/chapter detecting circuit detects an intermission of audio and video information, a switch is driven in response to an output control signal output from a control circuit, and the specific information is output to a display device. Therefore, a person receiving the specific information such as traffic information is not made to feel uncomfortable.

20 Claims, 9 Drawing Sheets

RECORDING/REPRODUCING DEVICE WHICH RECEIVES AN FM MULTIPLEXED SIGNAL COMPRISING A SUBCARRIER OR A DARC SIGNAL AND OUTPUTS TRAFFIC INFORMATION AFTER DETECTING AN INTERMISSION

BACKGROUND OF THE INVENTION

1. Field of the Invention

The present invention relates to multiplexed information receiving devices having a function of automatically switching among a plurality of pieces of information from a plurality of information sources and outputting the same, and more particularly, to a multiplexed information receiving device capable of automatically switching among a plurality of pieces of information including traffic information transmitted by FM multiplex broadcasting and outputting the same.

2. Description of the Background Art

As broadcast offering new services, FM multiplex broadcasting multiplexing digital signals with existing FM stereo broadcasting signals in their vacant frequency baseband spectra is now being developed for practical use.

In particular, an FM multiplex broadcasting system for mobiles is new media multiplexing digital signals in a frequency band higher than that of sound signals of existing FM stereo broadcasting and transmitting traffic information, character and graphic information, and the like to mobiles. The FM multiplex broadcasting system for mobiles has following advantages. More specifically, in this system, a frequency can be used effectively, broadcast equipment can be implemented simply, and data can be received in mobiles, whereby traffic information can be easily transmitted to mobiles such as automobiles.

A vehicle navigation system currently mounted on an automobile or the like operates based on fixed record information recorded on a CD-ROM or the like. Therefore, a driver or the like of the automobile cannot be informed of real-time information on traffic jams or the like.

Therefore, it is desired that the above described FM multiplex broadcasting will be put to practical use earlier as means for solving chronic traffic jams in big cities, or as the most inexpensive transmission path for mobiles which can access necessary information not limited to traffic information at any time from anywhere.

On the other hand, it is conventionally known that, in an automobile with an on-vehicle audio device configured of audio devices such as an AM/FM receiver, a cassette tape deck, and a CD player, the audio device has a function of receiving traffic information in order to receive traffic information transmitted from a traffic information station.

A technique of switching such an audio device from the reproducing state to the traffic information receiving state when it can receive traffic information is disclosed in Japanese Patent Laying-Open No. 4-372229.

In the conventional technique, however, even if music or the like is being reproduced by the audio device, the audio device is automatically switched from the reproducing state to the traffic information receiving state when it can receive traffic information during reproduction of the music. Therefore, the music or the like is interrupted, making the driver or the like feel uncomfortable.

When the above described function of receiving traffic information is applied to a video information output device such as an on-vehicle TV device, the similar problem arises. More specifically, when it can receive traffic information, the video information output device is switched to the traffic information receiving state, and a TV program or the like is interrupted.

SUMMARY OF THE INVENTION

One object of the present invention is to provide a multiplexed information receiving device capable of reproducing traffic information without interrupting music or a TV program when the device switches from a state where audio and video information is output to a state where traffic information is output.

Another object of the present invention is to provide a multiplexed information receiving device which allows a receiver, when traffic information or the like is broadcast by FM multiplex broadcasting, to obtain the most recent traffic information or the like, and not to miss the traffic information or the like.

In brief, according to one aspect of the present invention, the multiplexed information receiving device having a function of switching between a first state in which audio and video information is output and a second state in which specific information is received and output includes an audio and video information signal output circuit, an information intermission detecting circuit, a specific information signal output circuit, a switching circuit, and an information output device.

The information intermission detecting circuit detects an intermission of the audio and video information, and outputs an information intermission detect signal. The specific information signal output circuit receives the specific information, and outputs a specific information signal. The switching circuit receives an audio and video information signal and the specific information signal, and outputs either of the two signals in response to the information intermission detect signal. The information output device receives the output of the switching circuit, and outputs the same as a video and/or a sound.

According to another aspect of the present invention, the multiplexed information receiving device having a function of switching between a first state in which audio and video information formed of at least one of audio information and first video information is output and a second state in which specific information, formed of at least one of character string information and second video information, including the same information group iteratively transmitted for a certain period with a prescribed transmission system is received and output includes an audio and video information signal output circuit, an information intermission detecting circuit, a specific information signal output circuit, a first recording medium, a specific information recording/reproducing device, a specific information update detecting circuit, a mode designation switch, a control circuit, a switching circuit, and an information output device.

The audio and video information signal output circuit outputs a signal corresponding to the audio and video information. The information intermission detecting circuit detects an intermission of the audio and video information, and outputs an information intermission detect signal. The specific information signal output circuit receives specific information, and outputs a signal corresponding to the specific information. The first recording medium records the specific information signal. The specific information recording/reproducing device carries out writing/reading of the specific information signal to/from the first recording medium. The specific information update detecting circuit detects an update state of the specific information, and outputs a specific information update signal. The mode designation switch outputs a switch mode designate signal designating switching operation between the first state and the second state in response to an external input. The control circuit receives the information intermission detect signal, the specific information update signal, and the switch mode designate signal, and, when a switch mode is designated and the specific information is updated, outputs an output control signal in response to the information intermission detect signal. The switching circuit receives the audio and video information signal and the specific information signal recorded on the first recording medium, and outputs either of the two signals in response to the output control signal. The information output device receives the output of the switching circuit, and outputs the same as a video and/or a voice.

According to still another aspect of the present invention, the specific information to be received is transmitted as a multiplexed information signal obtained by overlapping the specific information signal with a main information signal. The specific information signal output circuit includes a specific information receiving circuit receiving the multiplexed information signal and separating and demodulating the specific information signal, and a specific information reconstructing circuit receiving the output of the specific information receiving circuit and extracting a program information signal corresponding to the same information group from the specific information signal. The specific information reconstructing circuit receives and transmits the program information signal from and to the specific information recording/reproducing device, and outputs the program information signal recorded on the first recording medium to the switching circuit.

According to the present invention, when the intermission of the audio and video information is detected, the specific information is output to the information output device. Therefore, the main advantage of the present invention is that a person on the side of receiving information is not made to feel uncomfortable.

According to the present invention, when traffic information or the like is on the air, the traffic information or the like is automatically output upon update of the traffic information or the like. Therefore, another advantage of the present invention is that it ensures that a receiver can obtain the most recent traffic information or the like.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

[FM Multiplex Broadcasting System]

Before explaining the embodiments of the present invention, a data structure of an FM multiplex broadcasting system will be described hereinafter schematically.

Although mobile reception has very poor transmission path characteristics due to multipath interference and fading interference, a system is desired which can receive perfect information in one operation as much as possible. However, some places within the service area suffer from strong multipath interference. Also, there are tunnels in the service area. Reception in one operation, therefore, is not always assured. In such a case, interpolation by retransmission of data must be performed. It is desired that the FM multiplex broadcasting service area is equivalent to the FM stereo broadcasting service area. However, even in this service area, the average bit error rate exceeds $10^{-2}$ in some places. Therefore, transmission data, the error correction code and the frame configuration are determined taking such poor transmission path characteristics into consideration.

Mobile reception is affected not only by multipath interference but also by fading interference. The error caused by extreme voltage drop by fading interference is fatal, which cannot be sometimes corrected. By matching the block length of transmission data with the average burst length of an error caused by fading, data can be interpolated by replacing the entire block with retransmitted block data, when an error which cannot be corrected occurs.

Because of the high error correction effect, a product code obtained by arranging two block codes orthogonally is used as the error correction code. Therefore, data has a two-dimensional frame configuration of a plurality of blocks including an error correction code both in the longitudinal and lateral directions.

Transmission data has a hierarchical layered structure with data in the above described one frame as an elementary unit.

As a specific example of the above description, an FM multiplex broadcasting system disclosed in *Proc. of Vehicle Navigation & information Systems Conference* (1994) A4-2 pp. 111–116 will be described.

Figure 9:
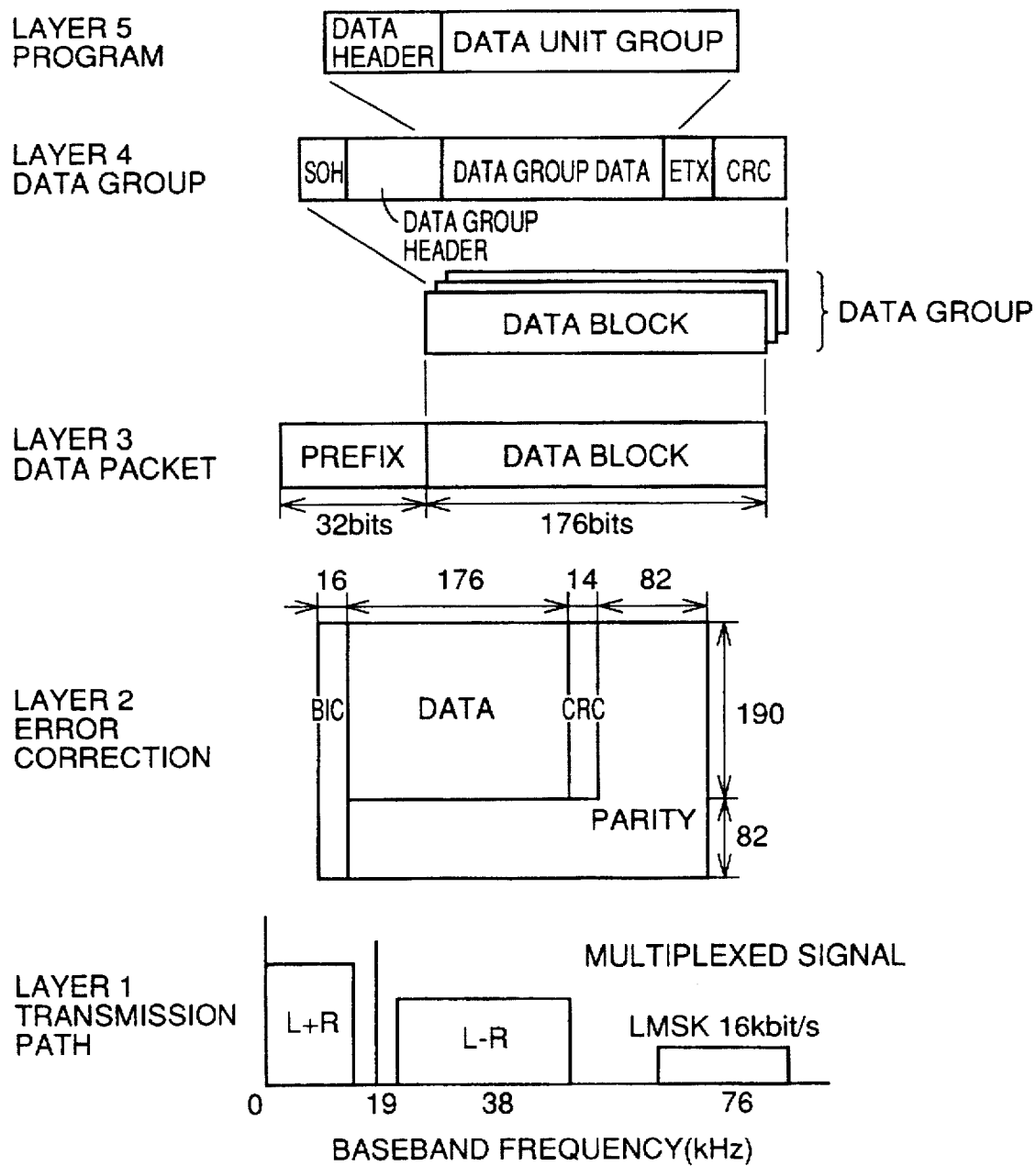
FIG. 9 is a specification diagram showing one example of a data structure of FM multiplex broadcasting.

FIG. 9 shows a specific specification of the above described hierarchical layered structure.

In a layer 1, transmission path characteristics are defined. In addition to an L+R signal and an L−R signal which are ordinary FM stereo broadcast signals, a multiplexed signal is overlapped on the side of frequency higher than that of the L−R signal.

As this overlapping method, a method called LMSK (Level controlled Minimum Shift Keying) is employed which controls multiplexing level by the degree of modulation of the L−R signal, taking into consideration the fact that the interference of the multiplex signal with a sound signal is significant when the degree of modulation of sound is small.

In a layer 2, a frame configuration of data including an error correction code is defined. Each frame is formed of 272 blocks with a 16-bit BIC (Block Identification Code) added at the head. Based on the BIC, frame synchronization and block synchronization are carried out. One hundred and ninety blocks out of 272 blocks are packets which transmit data, and 82 blocks are parity packets transmitting parity codes in the column direction. Each packet is structured of a 176-bit information portion, a 14-bit CRC (Cyclic Redundancy Code) serving as error correction codes, and 82-bit parity codes.

More specifically, with this one frame as an elementary unit, transmission data is error-corrected at this stage.

In a layer 3, a structure of a data packet is defined. The data packet includes 176 bits excluding the BIC, the CRC, and the parity codes of each row in the frame. Further, the data packet is structured of a prefix and a data block.

The prefix includes information for identifying the content of data, designating which program content, to be described later, the data packet belongs to, for example.

In a layer 4, the structure of a data group is defined. The data group is formed of one or a plurality of data blocks. The data group also includes the CRC which is an error correction code, and transmission data is error-corrected also in this layer.

In a layer 5, the structure of program data is defined. A program of general character and/or graphic information is structured of a plurality of data groups. The head data group includes encoded information associated with the entire program such as a program number and the total number of pages as program management data. There are a plurality of page data subsequent to the program management data, and data of each page is encoded.

More specifically, in the above described data structure, the program data is formed into a group of data representing one block of information on the receiving side. Taking traffic information as an example, program information represents the congestion or the like at each junction of a specific road (expressway).

Therefore, with such a data structure as described above, an intermission in the program information can be detected. Further, the same program information is iteratively broadcast for a certain period until the program information is updated.

[First Embodiment]

Figure 1:
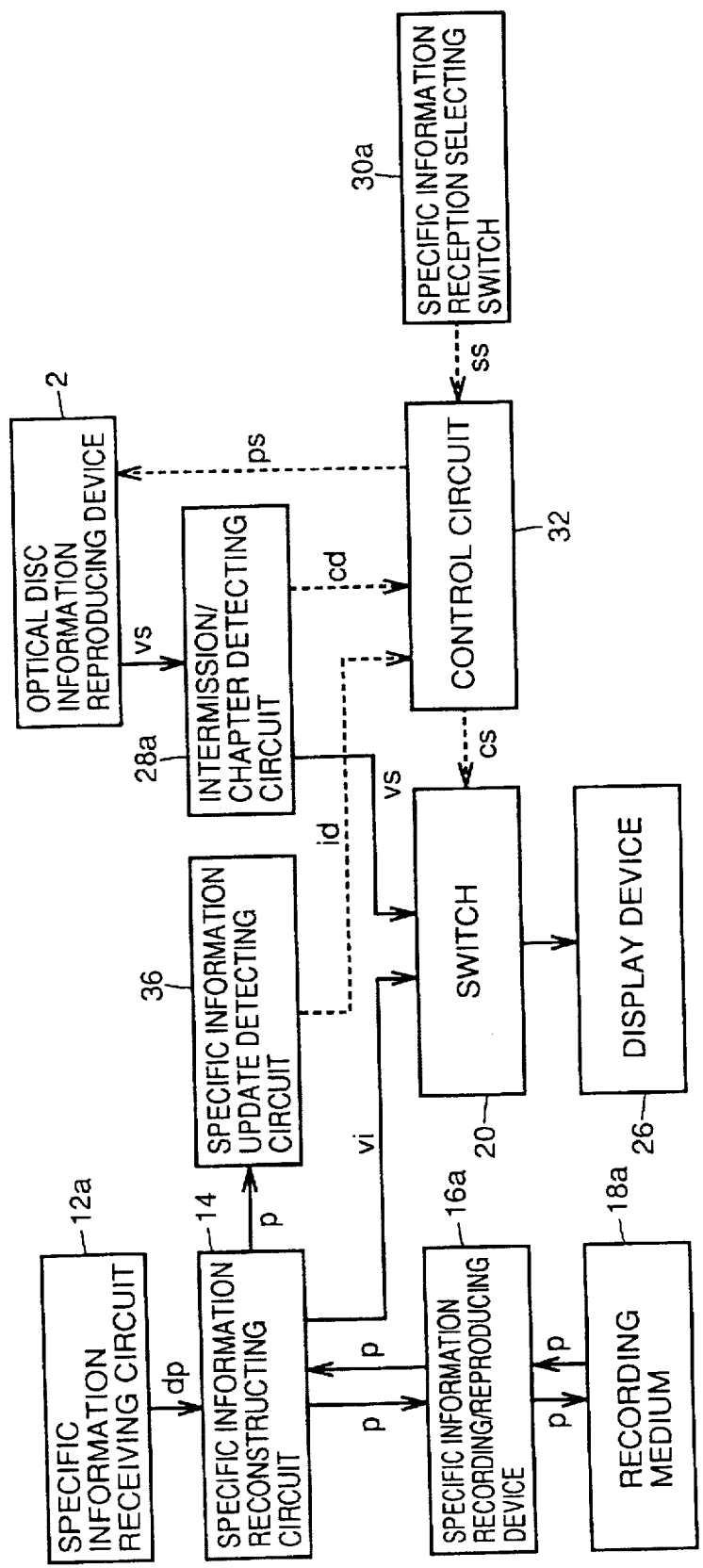
FIG. 1 is a schematic block diagram showing a structure of a first embodiment of the present invention.

FIG. 1 is a schematic block diagram showing the structure of the multiplexed information receiving device according to the first embodiment of the present invention.

An optical disc information reproducing device 2 reproduces video information recorded on a compact disc (CD) or a digital video disc (DVD) for example, and outputs a video signal vs to an intermission/chapter detecting circuit 28a. Intermission/chapter detecting circuit 28a outputs video signal vs to a switch 20, and, upon detection of an intermission signal or chapter signal, which is an intermission of optical disc information, outputs an information intermission detect signal cd to a control circuit 32. In response to a mode select signal ss from a specific information reception selecting switch 30a, a specific information detect signal id from a specific information update detecting circuit 36, and information intermission detect signal cd from intermission/ chapter detecting circuit 28a, control circuit 32 outputs an output control signal cs controlling switching operation of switch 20.

A specific information receiving circuit 12a receives wave which carries multiplexed information signals by the above described FM multiplex broadcasting system, and separates and demodulates the multiplexed information signals. In the demodulation procedure, error correction based on error correction codes is carried out. A separated and demodulated data packet signal dp is output to a specific information reconstructing circuit 14. Specific information reconstructing circuit 14 receives data packet signal dp, picks up data blocks, and reconstructs the data blocks into a data group. Further, specific information reconstructing circuit 14 reconstructs program information based on the data group, and outputs a program information signal p to specific information update detecting circuit 36 and a specific information recording/reproducing device 16a. Specific information recording/reproducing device 16a carries out writing/ reading operation of program information signal p to/from a recording medium 18a.

Specific information reconstructing circuit 14 further outputs a video information signal vi based on program information signal p to switch 20. Upon detection of update of program information signal p, specific information update detecting circuit 36 outputs a specific information update signal id to control circuit 32. When a switch mode is designated and the program information is updated, control circuit 32 outputs, upon detection of an intermission or chapter by intermission/chapter detecting circuit 28a, output control signal cs which instructs switch 20 to switch the output from video information signal vs based on the optical disc information to video information signal vi based on the specific information signal. An output from switch 20 is displayed as a corresponding image by a display device 26.

Figure 2:
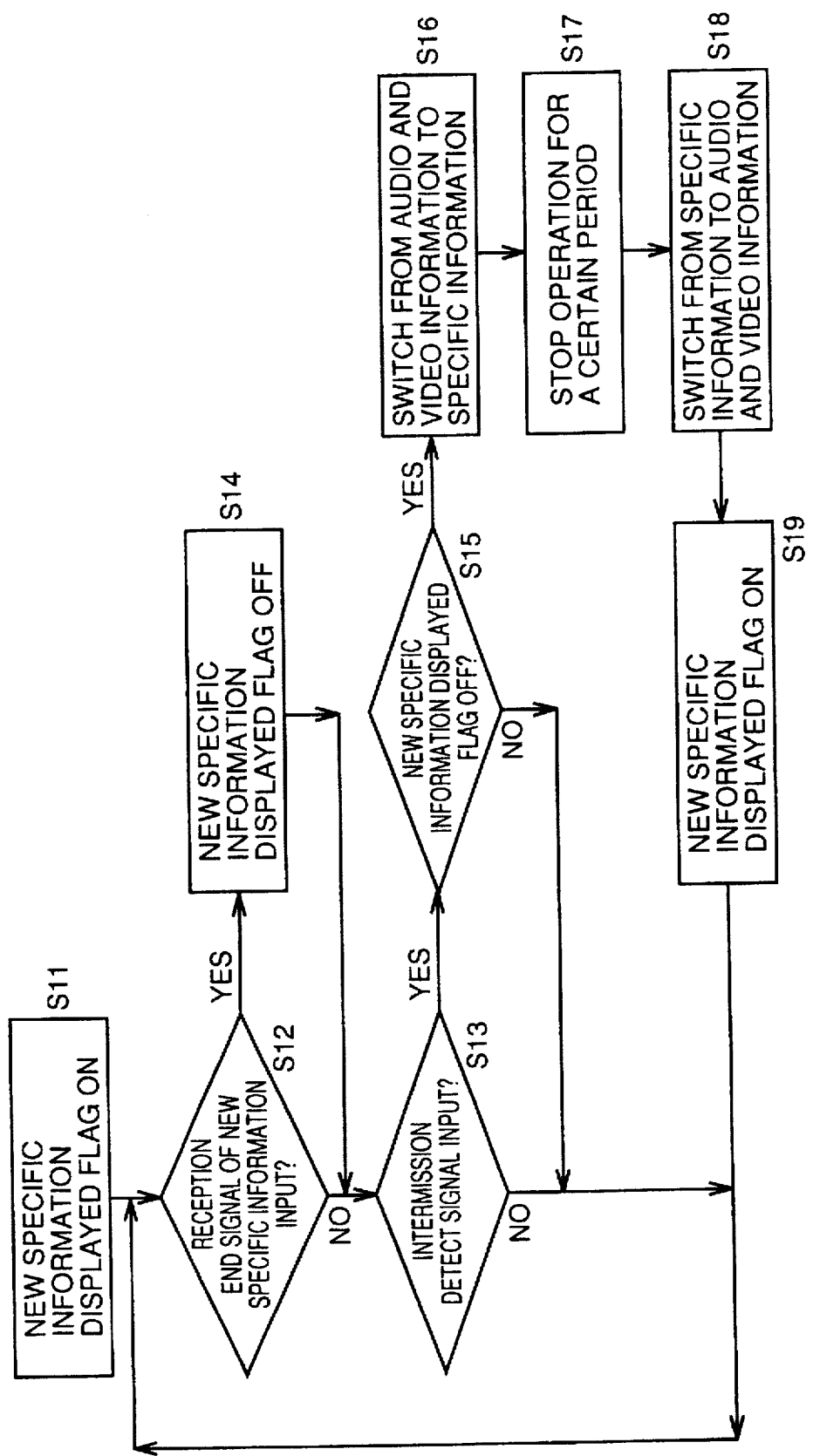
FIG. 2 is a flow chart showing operation of the first embodiment.

Referring to FIG. 2, operation of control circuit 32 in the first embodiment will be described in detail.

In the following description, assume that mode select signal ss is in an on state, that is, in a switch operation mode. A state where display of certain specific information is complete, and that a new specific information displayed flag is set (on state) is assumed to a beginning state (step S11).

Based on specific information update detect signal id from specific information update detecting circuit 36, it is determined whether or not new specific information has been completely received (step S12).

Based on the determination result, the procedure branches into the following two cases.

i) The case where new specific information has not been completely received, and an intermission of audio information has not been detected.

Subsequently, based on information intermission detect signal cd from intermission/chapter detecting circuit 28a, it is determined whether or not an intermission of audio and video information has been detected (step S13).

When an intermission has not been detected, the procedure returns to step S12, and forms a loop. More specifically, the device enters a standby mode of the operation.

ii) The case where new specific information has been completely received.

A new specific information displayed flag is reset (step S14).

Subsequently, based on information intermission detect signal cd from intermission/chapter detecting circuit 28a, it is determined whether or not an intermission of audio and video information has been detected (step S13).

Based on the determination result, the procedure further branches into the following two cases:

ii-a) The case where an intermission has not been detected in audio and video information.

The procedure again returns to step S12, and forms the loop.

ii-b) The case where an intermission has been detected in audio and video information.

Subsequently, it is determined whether or not the new specific information displayed flag is reset (step S15).

Since the new specific information displayed flag is reset, output control signal cs switching the output of switch 20 from video information signal vs from optical disc information reproducing device 2 to video information signal vi from specific information reconstructing circuit 14 is output to switch 20 (step S16).

On the other hand, a signal ps temporarily halting operation for a certain period until termination of output of program information is provided to optical disc information reproducing device 2 (step S17).

When output of program information is terminated, output control signal cs switching the output of switch 20 to video information signal vs is provided to switch 20, and signal ps instructing restart of operation is provided to optical disc information reproducing device 2 (step S18).

A new specific information displayed flag is set (step S19).

The procedure again returns to step S12, and forms the loop. The device again enters the standby state of operation.

By structured as described above, specific information is output only when an intermission of audio and video information, for example, an intermission between music and music, is detected. A person on the side of receiving the information is not made to feel uncomfortable.

[Second Embodiment]

Figure 3:
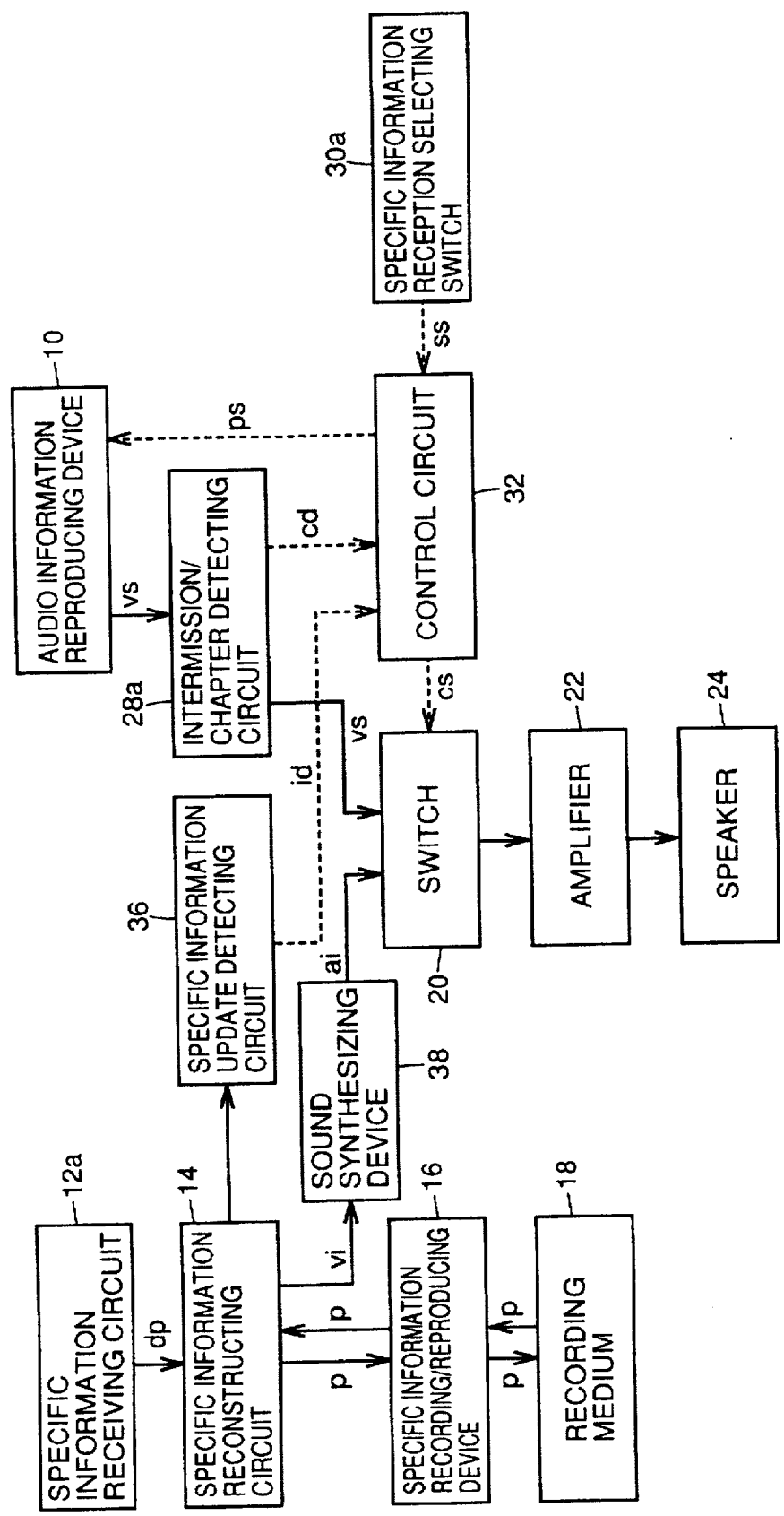
FIG. 3 is a schematic block diagram showing a structure of a second embodiment of the present invention.

FIG. 3 is a schematic block diagram showing the structure of the second embodiment of the present invention.

The second embodiment is different from the first embodiment in that the device outputting audio and video information is replaced with an audio information reproducing device 10 reproducing only audio information.

Audio information reproducing device 10 includes, for example, a cassette tape reproducing device in addition to the optical disc, such as CD or DVD, information reproducing device.

Therefore, the second embodiment is further different from the first embodiment in that display device 26 is replaced with an amplifier 22 and a speaker 24.

The second embodiment is further different from the first embodiment in that a sound synthesizing device 38 is provided which receives the specific information signal transmitted as character information from specific information reconstructing circuit 14, converts the signal into a sound information signal ai, and outputs the converted signal to switch 20.

In the second embodiment, video information signal vi corresponding to the specific information signal is converted into sound information signal ai. Other than that, operation of the second embodiment is similar to that of the first embodiment, and the description thereof will not be repeated here.

By such a structure of the second embodiment as described above, sound information corresponding to the specific information signal is output only when an intermission of audio information from audio information reproducing device 10, for example, an intermission between music and music, is detected. Therefore, a person on the side of receiving the information is not made to feel uncomfortable.

[Third Embodiment]

Figure 4:
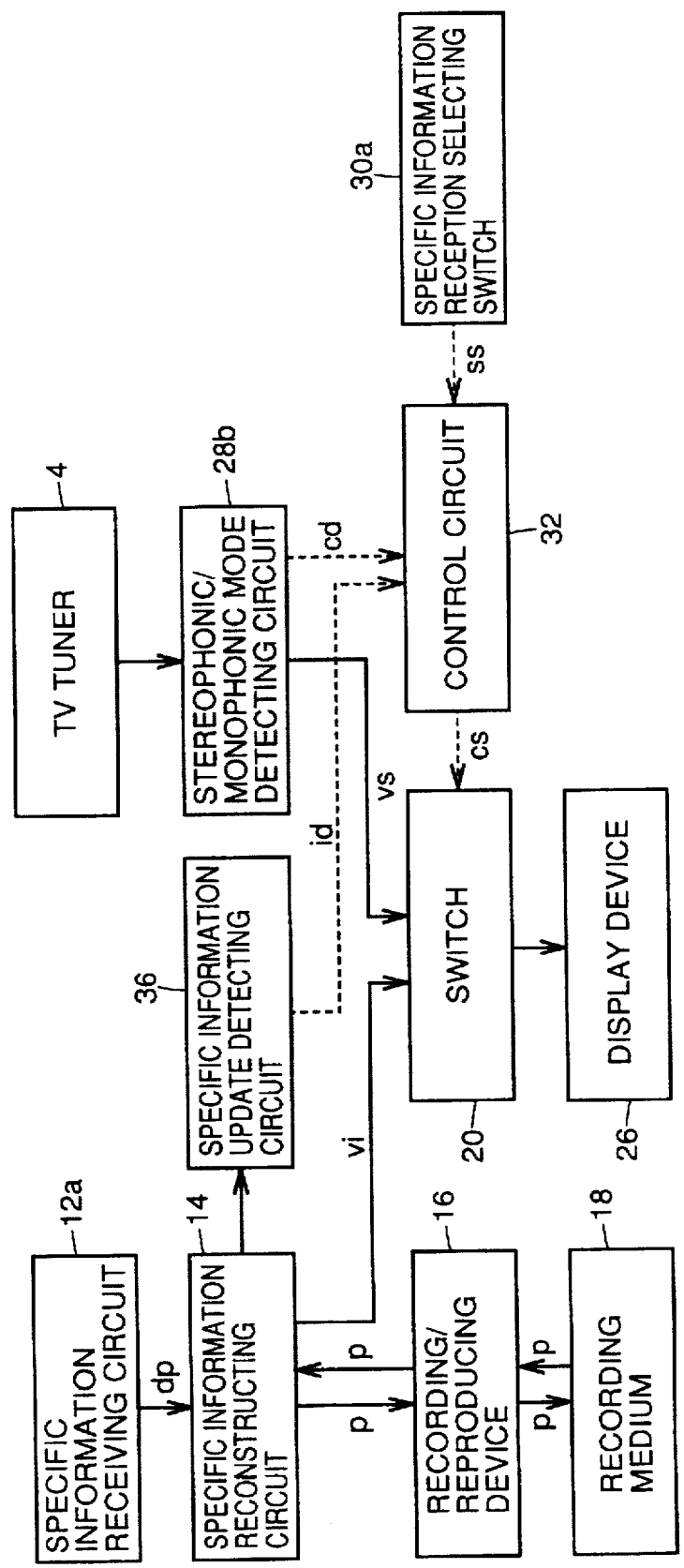
FIG. 4 is a schematic block diagram showing a structure of a third embodiment of the present invention.

FIG. 4 is a schematic block diagram showing the structure of the third embodiment of the present invention.

The first difference between the first embodiment and the third embodiment is that the device outputting audio and video information is replaced with a TV tuner 4.

The second difference is that intermission/chapter detecting circuit 28a is replaced with a stereophonic/monophonic mode detecting circuit 28b.

In this case, display device 26 is to output both video information and audio information.

The third difference is that a temporary stop signal PS is not output to TV tuner 4 from control circuit 32.

In the first embodiment, an intermission of the audio and video information signal was detected by detecting a chapter signal recorded in an optical disc in intermission/chapter detecting circuit 28a. In this embodiment, an intermission of information is detected by using TV broadcast switching from a monophonic mode to a stereophonic mode during broadcast of a commercial message, for example.

Other than that, the third embodiment is similar to the first embodiment, and the description of the basic structure will not be repeated here.

Figure 5:
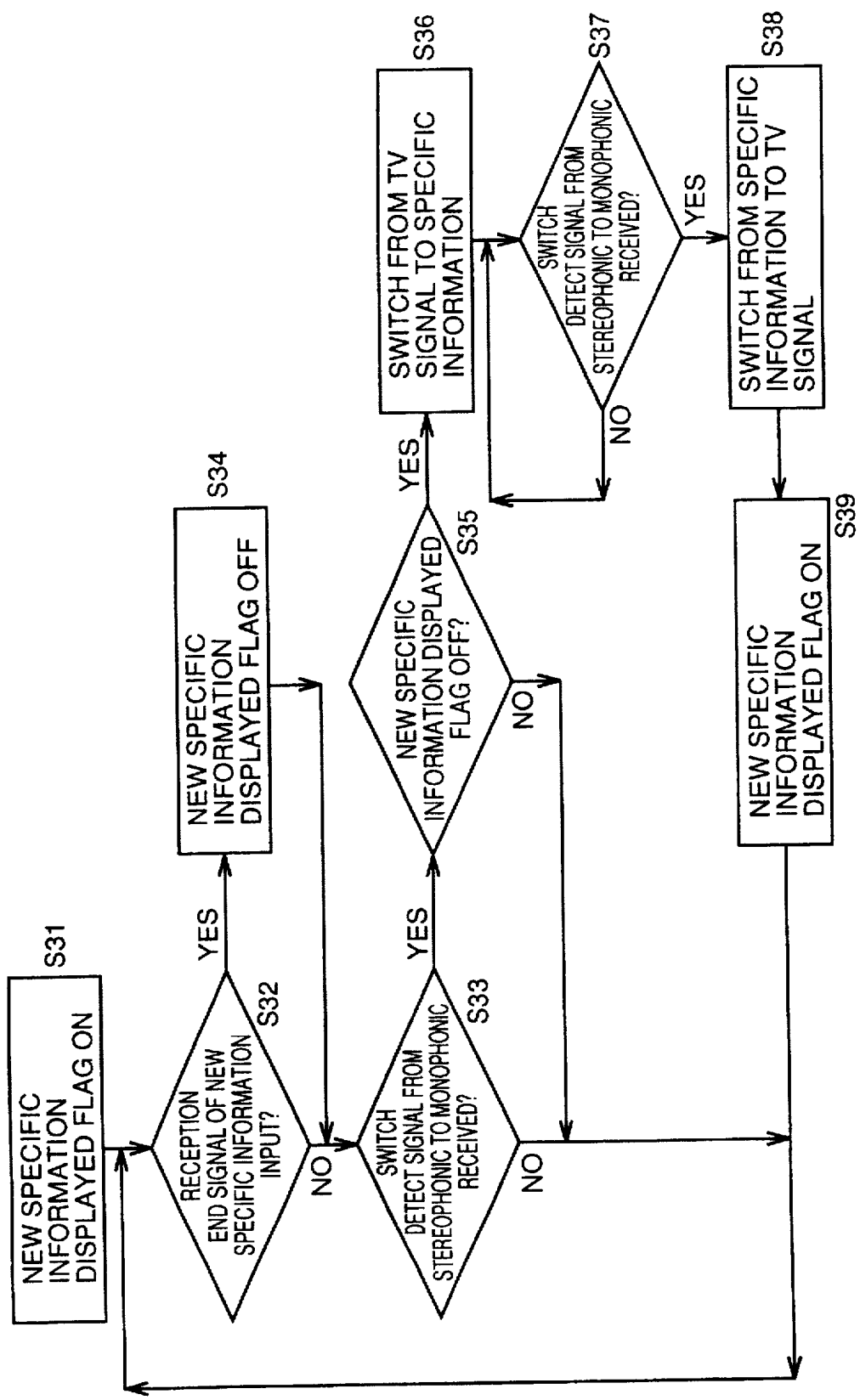
FIG. 5 is a flow chart showing operation of the third embodiment.

Note that control operation to respective components in the third embodiment is different from that in the first embodiment. Referring to FIG. 5, operation of control circuit 32 in the third embodiment will be described in detail.

In the following description, assume that specific information output select signal ss is in an on state, that is, in a switching mode.

A state where display of certain specific information is terminated, and where a new specific information displayed flag is set (on state) is assumed to be a begging state (step S31).

Based on specific information update detect signal id from specific information update detecting circuit 36, it is determined whether or not new specific information has been completely received (step S32).

Based on the determination result, the procedure branches into the following two cases.

i) The case where new specific information has not been completely received, and an intermission of audio and video information has not been detected.

Subsequently, based on information intermission detect signal cd from stereophonic/monophonic mode detecting circuit 28b, it is determined whether or not an intermission of audio and video information has been detected (step S33).

When an intermission has not been detected, the procedure returns to step S32, and forms a loop. More specifically, the device enters a standby state of operation.

ii) The case where new specific information has been completely received.

A new specific information displayed flag is reset (step S34).

Subsequently, based on information intermission detect signal cd from stereophonic/monophonic mode detecting circuit 28b, it is determined whether or not an intermission of audio and video information has been detected (step S33).

Based on the determination result, the procedure branches into the following two cases.

ii-a) The case where an intermission has not been detected in audio and video information.

The procedure again returns to step S32, and forms the above described loop.

ii-b) The case where an intermission has been detected in audio and video information.

Subsequently, it is determined whether or not the new specific information displayed flag is reset (step S35).

Since the new specific information displayed flag is reset, output control signal cs switching the output of switch 20 from an audio and video information signal (TV signal) av from TV tuner 4 to video information signal vi from specific information reconstructing circuit 14 is output to switch 20 (step S36).

It is then determined whether or not switching from a stereophonic mode to a monophonic mode is detected (step S37).

When the switching is not detected, the procedure enters the standby state. When the switching is detected, output control signal cs switching again the output of switch 20 to audio and video information signal av from TV tuner 4 is subsequently output to switch 20 (step S38).

The new specific information displayed flag is set (step S39).

The procedure again returns to step S32, and forms the loop. The procedure enters the standby state.

According to the structure of this embodiment, even when the audio and video information signal is externally transmitted on wave, video information corresponding to the specific information signal is output upon detection of an intermission of audio and video information. A person on the side of receiving the information is not made to feel uncomfortable.

[Fourth Embodiment]

Figure 6:
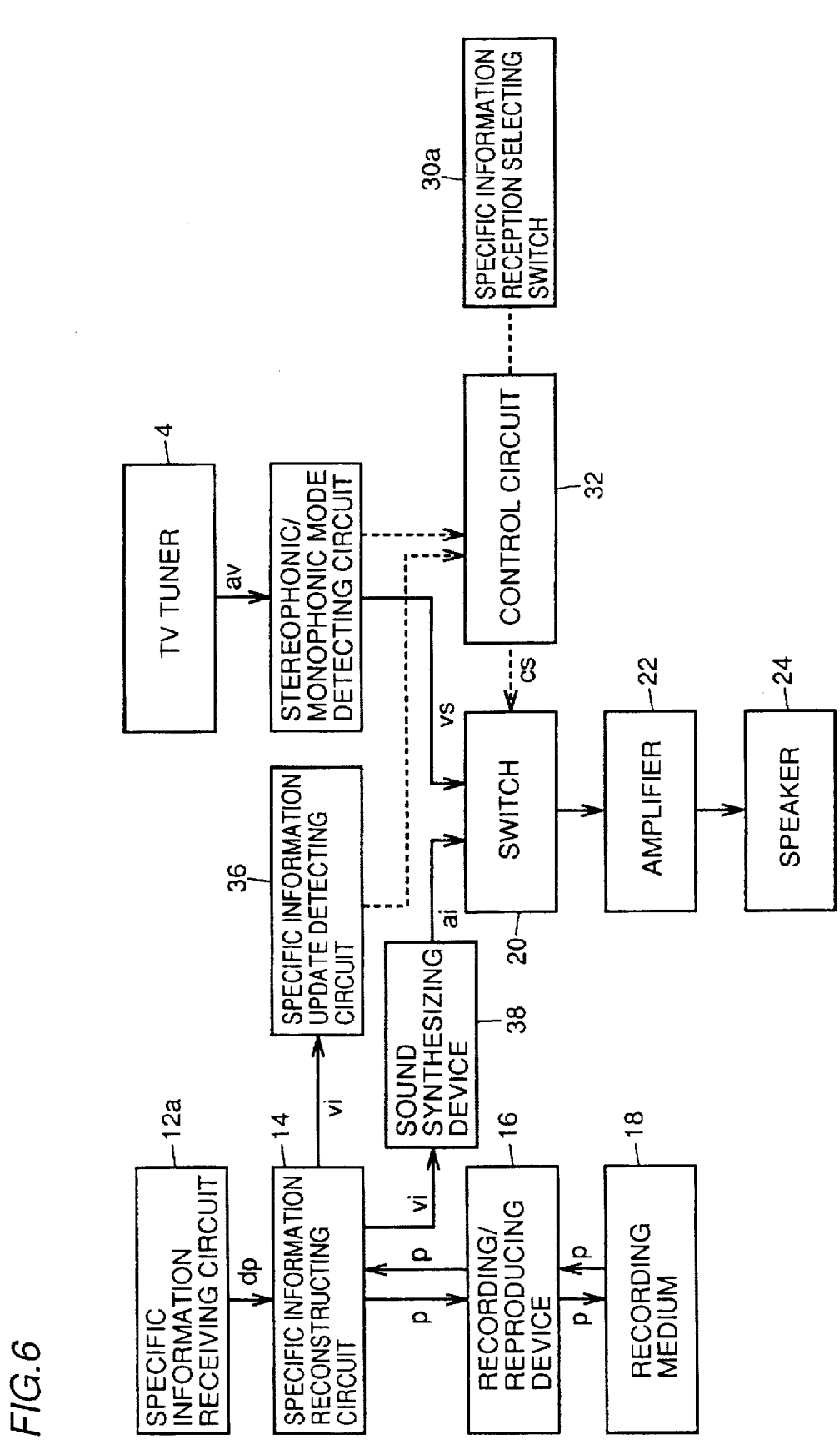
FIG. 6 is a schematic block diagram showing a structure of a fourth embodiment of the present invention.

FIG. 6 is a schematic block diagram showing the structure of the fourth embodiment of the present invention.

The fourth embodiment is different from the second embodiment in that the device outputting the audio and video information signal is replaced with TV tuner 4 which outputs an audio signal by demodulating a signal externally carried on the air. It is needless to say that TV tuner 4 can be replaced with an AM tuner 6 or FM tuner 8.

Other than that, the fourth embodiment is similar to the second embodiment, and the description thereof will not be repeated here.

According to the structure of this embodiment, even when the audio and video information signal is externally carried on the air, specific information received as character string information is converted into a sound signal by sound synthesizing device 38 and output, upon detection of an intermission of the signal. Therefore, a person on the side of receiving the information is not made to feel uncomfortable.

[Fifth Embodiment]

Figure 7:
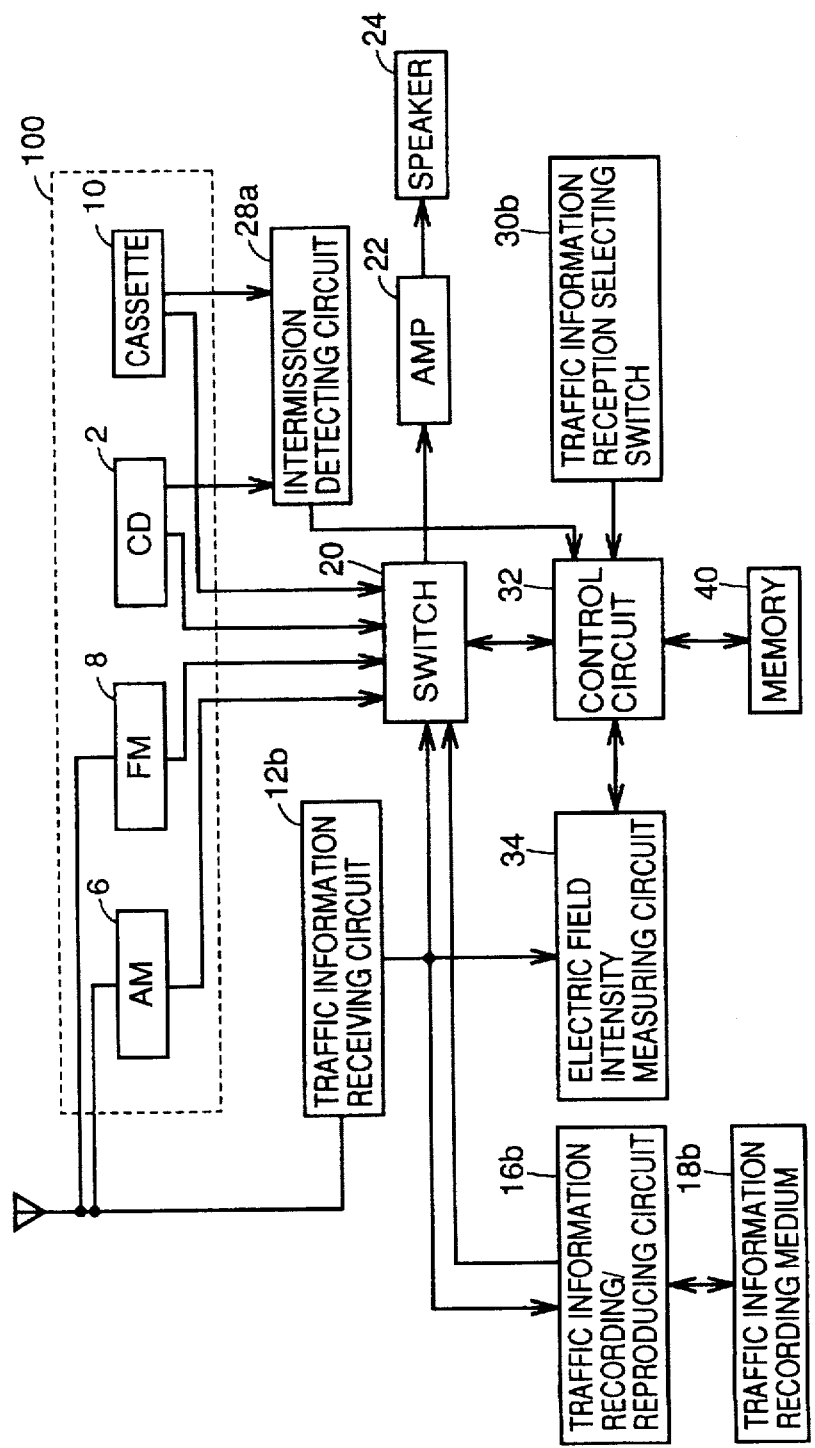
FIG. 7 is a schematic block diagram showing a structure of a fifth embodiment of the present invention.

FIG. 7 is a schematic block diagram showing the structure of the fifth embodiment of the present invention.

In the first to the fourth embodiments, the specific information signal was received as a multiplexed information signal. However, the method of transmitting specific information is not limited thereto. The specific information may be transmitted using another channel of wave.

This embodiment shows a structure in such a case.

An audio device 100 includes CD player 2, AM receiver 6, FM receiver 8, cassette tape deck 10, and the like.

A traffic information recording/reproducing circuit 16b records or reproduces traffic information supplied from a traffic information receiver 12b on or from a traffic information recording medium 18b to be described later. Traffic information recording medium 18b carries out recording or reproducing operation by traffic information recording/reproducing circuit 16b. Switch 20 selectively switches among respective outputs of audio device 100, the output of traffic information receiver 12b, and the output of traffic information recording/reproducing portion 16, and supplies the selected output to speaker 24 serving as sound reproducing means through amplifier 22.

Intermission detecting circuit 28a detects an intermission in music reproduced by CD player 2 and cassette tape deck 10. The output of intermission detecting circuit 28a enters control circuit 32, to be described later. A traffic information reception selecting switch 30b designates traffic information reception mode, and the output of traffic information reception selecting switch 30b enters control circuit 32, to be described later. Control circuit 32 is configured of a CPU and the like, and controls the entire device collectively. An electric field intensity measuring circuit 34 measures the electric field intensity of traffic information broadcast. Electric field intensity measuring circuit 34 starts measurement in response to an instruction from control circuit 32, and outputs the measurement result to control circuit 32. A memory 40 records the state of the audio device.

Figure 8:
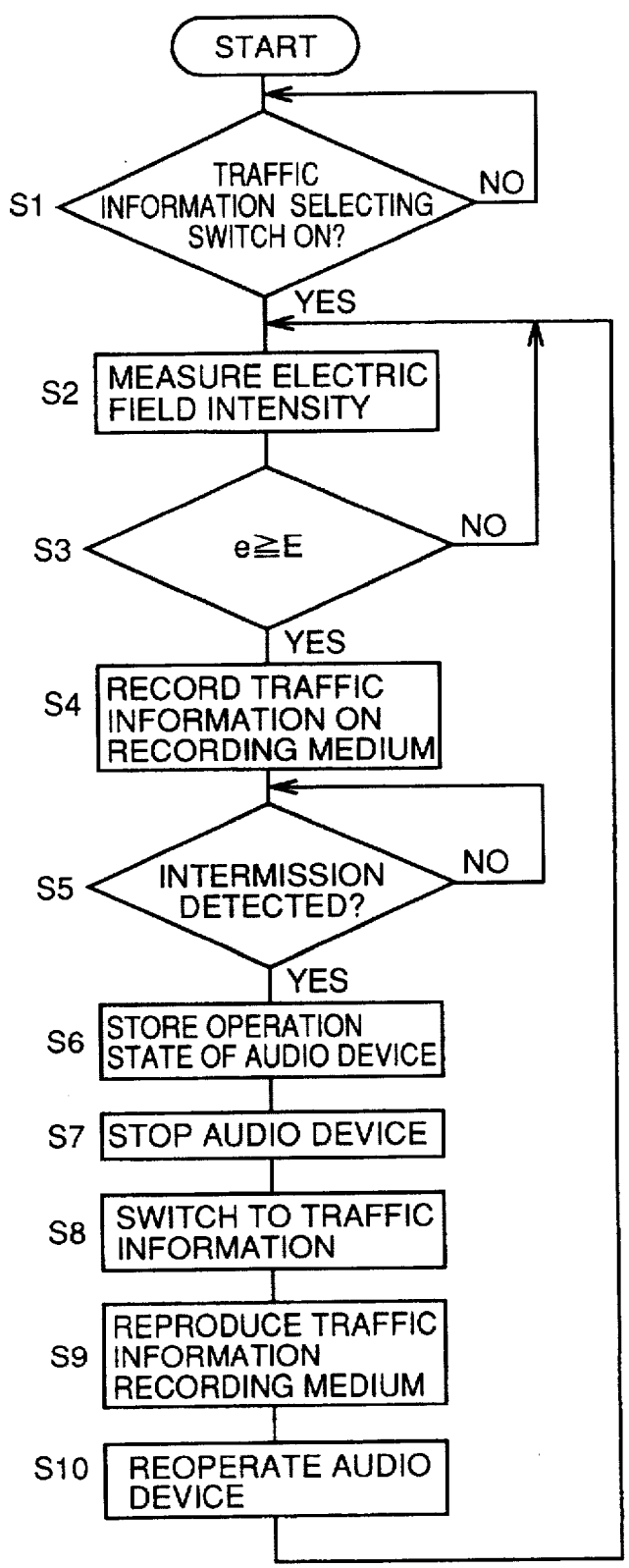
FIG. 8 is a flow chart showing operation of the fifth embodiment.

Description will be given of the control procedure which control circuits 32 performs during operation of audio device 100 structured as described above with reference to FIG. 8.

First, it is determined whether or not traffic information reception selecting switch 30b is turned on (step S1). When the switch is turned on, the procedure goes to the next step S2. On the other hand, when the switch is not turned on, that is, when the switch is in an off state, the determination of whether or not the switch being turned on is continued to be made in step S1 until traffic information reception selecting switch 30b is turned on. At this time, the state of audio device 100 is continuously maintained.

Then, electric field intensity measuring circuit 34 serving as measuring means is instructed to start measurement, and electric field intensity measuring circuit 34 measures the electric field intensity (step S2). Electric field intensity measuring circuit 34 measures the electric field intensity e of traffic information broadcast based on the output of traffic information receiver 12b, and supplies the measurement result to control circuit 32 on request.

Comparing the electric field intensity e measured by electric field intensity measuring circuit 34 and a preset electric field intensity E, the following processing is performed.

When $e \geq E$, it is determined that the traffic information broadcast can be received, and the procedure goes to a step S4.

On the other hand, when $e \geq E$ does not hold, the comparison procedure is continued in step S3 until $e \geq E$.

Then, traffic information from traffic information receiver 12b is sequentially recorded on traffic information recording medium 18b through traffic information recording/reproducing circuit 16b. Note that recording medium 18b is an optical disc with high intensity on which much information can be recorded. The optical disc includes a recordable and reproducible optical disc, a magnet-optical disc, a mini disc, and the like. Recording medium 18b may be a hard disc or semiconductor memory. Traffic information recording/reproducing circuit 16b records traffic information for a prescribed time, or a certain cycle portion of the traffic information on recording medium 18b. The traffic information may be recorded additionally to the entire information, or may be recorded in a supplementary manner. After recording, a record end signal is supplied to control circuit 32.

Then, it is determined whether or not an intermission detect signal has been input from intermission detecting circuit 28b detecting an intermission in music reproduced by CD player 2 and cassette tape deck 10 (step S5).

When an intermission detect signal has been input, the procedure goes to the next step S6. On the other hand, when an intermission detect signal has not been input, the determination of whether or not an intermission detect signal having been input is continued to be made in step S5 until one is input. As a method of detecting an intermission in intermission detecting circuit 28a, an intermission may be recognized when there is a certain period of silent time, or may be recognized when a subcode (intermission signal) attached to an intermission is detected by the CD player.

The operation state of the audio device at the time when an intermission is detected, for example, information of the audio device such as end of reproduction of the third number of a CD is stored in memory 40 so that control circuit 32 recognizes the same (step S6). Operation of the audio device is temporarily stopped (step S7).

Switch 20 is driven so that traffic information can be reproduced by traffic information recording/reproducing circuit 16b (step S8).

In response to output of a reproduction signal from control circuit 32 to traffic information recording/reproducing circuit 16b, traffic information recording/reproducing circuit 16b reproduces the traffic information stored in traffic information recording medium 18b, and supplies the traffic information to amplifier 22 through switch 20. Note that the traffic information may be reproduced not only once but also a plurality of times.

When reproduction of the traffic information is completed, information of the audio device stored in memory 40 in step S6 is read out, the audio device temporarily stopped in step S7 is reoperated according to the information (step S10), and the procedure returns to step S2.

When traffic information reception selecting switch 30b is turned off during the above described control processing, the traffic information reception control procedure comes to an end.

In this embodiment, traffic information is once recorded on traffic information recording medium 18b, and the traffic information is reproduced. However, intermission detection may be carried out when traffic information per se is detected, and the traffic information may be directly reproduced from traffic information receiver 12b upon detection of an intermission.

Further, in this embodiment, the electric field intensity measuring circuit was used as measuring means. However, the present invention is not limited thereto. As the measuring means of the present invention, a measuring circuit detecting a reception error or the like may be used.

As is clear from the above description, according to this embodiment, operation of audio device 100 when tuning in to a traffic information broadcasting station, traffic information is recorded on a recording medium when it can receive traffic information broadcast, the output of a switch is switched so that the traffic information recorded on the recording medium is reproduced when an intermission in music reproduced by audio device 100 is detected, and the traffic information is reproduced in the intermission without interrupting the music, so that a person on the side of receiving the information is not made to feel uncomfortable. Further, according to this embodiment, the traffic information is automatically received, and reproduced in the intermission in music. Therefore, a person on the receiving side can obtain the most recent traffic information. Further, the device of the present invention automatically starts to receive traffic information according to the operator's instruction to receive the traffic information, so that the operator can obtain the most recent traffic information only for a period during which the operator wants to obtain the information. Further, traffic information once recorded on an optical disc is reproduced in an intermission in music. Therefore, it can be prevented that a person on the receiving side fails to hear the traffic information.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A multiplexed information receiving device having a function of switching between a first state in which audio and video information is output and a second state in which specific information, in which the specific information is formed of at least one of characters string information and second video information and transmitted as the iterative same information group for a certain period by a prescribed transmission format, is received and output, comprising:

audio and video information signal output means for outputting an audio and video information signal;

information intermission detecting means for detecting an intermission of said audio and video information and outputting an information intermission detect signal;

specific information signal output means for receiving said specific information and outputting a specific information signal, said specific information corresponding to multiplex broadcasting information;

switching means for receiving said audio and video information signal and said specific information signal and outputting either of the two signals upon detection of said information intermission detect signal by said information intermission detecting means;

mode designating means for receiving said information intermission detect signal and for outputting a switch mode designate signal to said switching means so as to designate whether switching operation between said first state and said second state is to be carried out; and information output means for receiving an output from said switching means and outputting the received output as a video and/or a sound.

2. The multiplexed information receiving device according to claim 1, further comprising:

mode designating means responsive to an external input for outputting a switch mode designate signal designating whether switching operation between said first state and said second state is to be carried out; and control means for receiving said information intermission detect signal and said switch mode designate signal and, when said switch mode is designated, outputting an output control signal in response to said information intermission detect signal, wherein said switching means receives said audio and video information signal and said specific information signal and outputs either of the two signals in response to said output control signal.

3. A multiplexed information receiving device having a function of switching between a first state in which audio and video information formed of at least one of audio information and first video information is output, and a second state in which specific information, which is formed of at least one of character string information and second video information and transmitted as the iterative same information group for a certain period by a prescribed transmission format, is received and output, comprising:

audio and video information signal output means for outputting a signal corresponding to said audio and video information;

information intermission detecting means for detecting an intermission of said audio and video information and outputting an information intermission detect signal;

specific information signal output means for receiving said specific information and outputting a signal corresponding to said specific information, said specific information corresponding to multiplex broadcasting information;

a first recording medium on which said specific information signal is recorded;

specific information recording/reproducing means for carrying out writing/reading operation of said specific information signal to/from said first recording medium;

specific information update detecting means for detecting an update state of said specific information and outputting a specific information update signal;

mode designating means responsive to an external input for outputting a switch mode designate signal designating whether switching operation between said first state and said second state is to be carried out;

control means for receiving said information intermission detect signal, said specific information update signal, and said switch mode designate signal and outputting an output control signal in response to said information intermission detect signal, when said switch mode is designated and said specific information is updated;

switching means for receiving said audio and video information signal and said specific information signal recorded on said first recording medium and outputting either of said audio and video information signal and said specific information signal in response to said output control signal outputted by said control means upon detection of said information detect signal by said information intermission detecting means; and information output means for receiving an output from said switching means and outputting the received output as a video and/or a sound.

4. The multiplexed information receiving device according to claim 3, further comprising a second recording medium on which audio and video information is recorded, wherein said audio and video information output means includes audio and video information reproducing means for reading out an audio and video information signal recorded on said second recording medium, and said control means outputs to said audio and video information reproducing means a temporary stop signal when said multiplexed information receiving device switches from said first state to said second state, and an operation restart signal when said multiplexed information receiving device switches from said second state to said first state.

5. The multiplexed information receiving device according to claim 4, wherein said specific information is transmitted as a multiplexed information signal obtained by overlapping a specific information signal with a main information signal, said specific information signal output means includes specific information receiving means for receiving said multiplexed information signal and separating and demodulating said specific information signal, and specific information reconstructing means for receiving an output from said specific information receiving means and extracting a program information signal corresponding to said same information group from said specific information signal, said specific information reconstructing means receiving and transmitting said program information signal from and to said specific information recording/reproducing means, and outputting said program information signal recorded on said first recording medium to said switching means.

6. The multiplexed information receiving device according to claim 5, wherein said main information signal is an FM stereophonic signal, and said specific information signal is multiplexed with the main information signal.

7. The multiplexed information receiving device according to claim 5, wherein said specific information receiving means includes signal intensity measuring means for detecting the intensity of said multiplexed information signal being at least a prescribed value and outputting a signal intensity determination signal, and said control means receives said signal intensity determination signal, and outputs said output control signal switching said multiplexed information receiving device from said first state to said second state when the intensity of said multiplexed information signal is at least a prescribed value.

8. The multiplexed information receiving device according to claim 5, wherein said specific information signal is a two-dimensional video information signal, and said information output means includes a two-dimensional display device.

9. The multiplexed information receiving device according to claim 5, wherein said multiplexed information receiving device further includes sound synthesizing means for converting input character string information into a sound signal, said sound synthesizing means receiving an output from said specific information reconstructing means and outputting a corresponding sound signal to said switching means.

10. The multiplexed information receiving device according to claim 5, wherein said first recording medium is a recordable and reproducible optical disc.

11. The multiplexed information receiving device according to claim 10, wherein said multiplexed information receiving device is mounted on a mobile, and said specific information is traffic information.

12. The multiplexed information receiving device according to claim 3, wherein said audio and video information output means further includes audio and video information receiving means for receiving and demodulating an audio and video information signal externally transmitted on the air.

13. The multiplexed information receiving device according to claim 12, wherein said specific information is transmitted as a multiplexed information signal obtained by overlapping a specific information signal on a main information signal, said specific information signal output means includes specific information receiving means for receiving said multiplexed information signal and separating and demodulating said specific information signal, and specific information reconstructing means for receiving an output from said specific information receiving means and extracting a program information signal corresponding to said same information group from said specific information signal, said specific information reconstructing means transmitting and receiving said program information signal to and from said specific information recording/reproducing means, and outputting said program information signal recorded on said first recording medium to said switching means.

14. The multiplexed information receiving device according to claim 13, wherein said main information signal is an FM stereophonic signal, and said specific information signal is multiplexed with the main information signal.

15. The multiplexed information receiving device according to claim 13, wherein said specific information receiving means includes signal intensity measuring means for detecting the intensity of said multiplexed information signal being at least a prescribed value and outputting a signal intensity determination signal, and said control means receives said signal intensity determination signal, and outputs said output control signal switching said multiplexed information receiving device from said first state to said second state when the intensity of said multiplexed information signal is at least a prescribed value.

16. The multiplexed information receiving device according to claim 13, wherein said specific information signal is a two-dimensional video information signal, and said information output means includes a two-dimensional display device.

17. The multiplexed information receiving device according to claim 13, wherein said multiplexed information receiving device further includes sound synthesizing means for converting input character string information into a sound signal, said sound synthesizing means receiving an output from said specific information reconstructing means and outputting a corresponding sound signal to said switching means.

18. The multiplexed information receiving device according to claim 13, wherein said first recording medium is a recordable and reproducible optical disc.

19. The multiplexed information receiving device according to claim 18, wherein said multiplexed information receiving device is mounted on a mobile, and said specific information is traffic information.

20. A multiplexed information receiving device having a function of switching between a first state in which audio and video information formed of at least one of audio information and first video information is output, and a second state in which specific information, which is formed of at least one of character string information and second video information and transmitted as the iterative same information group for a certain period by a prescribed transmission format, is received and output, comprising:

audio and video information signal output means for outputting a signal corresponding to said audio and video information;

information intermission detecting means for detecting an intermission of said audio and video information and outputting an information intermission detect signal;

specific information signal output means for receiving said specific information and outputting a signal corresponding to said specific information, said specific information corresponding to multiplex broadcasting information;

a first recording medium on which said specific information signal is recorded;

specific information recording/reproducing means for carrying out writing/reading operation of said specific information signal to/from said first recording medium;

specific information update detecting means for detecting an update state of said specific information and outputting a specific information update signal;

mode designating means responsive to an external input for outputting a switch mode designate signal designating whether switching operation between said first state and said second state is to be carried out;

control means for receiving said information intermission detect signal, said specific information update signal, and said switch mode designate signal and outputting an output control signal in response to said information intermission detect signal, when said switch mode is designated and said specific information is updated;

switching means for receiving said audio and video information signal and said specific information signal recorded on said first recording medium and outputting either of said audio and video information signal and said specific information signal in response to said output control signal outputted by said control means upon detection of said information detect signal by said information intermission detecting means;

information output means for receiving an output from said switching means and outputting the received output as a video and/or a sound; and a second recording medium on which audio and video information is recorded, wherein said audio and video information output means includes audio and video information reproducing means for reading out an audio information signal recorded on said second recording medium, and wherein said control means outputs to said audio and video information reproducing means a temporary stop signal when said multiplexed information receiving device switches from said first state to said second state, and an operation restart signal when said multiplexed information receiving device switches from said second state to said first state.

* * * * *